US010725836B2

(12) United States Patent
Savenkov et al.

(10) Patent No.: US 10,725,836 B2
(45) Date of Patent: Jul. 28, 2020

(54) INTENT-BASED ORGANISATION OF APIS

(71) Applicant: INTENTO, INC., Wilmington, DE (US)

(72) Inventors: Konstantin Savenkov, Moscow (RU); Grigory Sapunov, Moscow (RU)

(73) Assignee: INTENTO INC., Wilmington, DE (US)

( * ) Notice: Subject to any disclaimer, the term of this patent is extended or adjusted under 35 U.S.C. 154(b) by 0 days.

(21) Appl. No.: 16/608,481

(22) PCT Filed: Apr. 3, 2018

(86) PCT No.: PCT/US2018/025815
§ 371 (c)(1),
(2) Date: Oct. 25, 2019

(87) PCT Pub. No.: WO2018/200135
PCT Pub. Date: Nov. 1, 2018

(65) Prior Publication Data
US 2020/0192727 A1 Jun. 18, 2020

Related U.S. Application Data

(60) Provisional application No. 62/489,505, filed on Apr. 25, 2017.

(51) Int. Cl.
*G06F 9/54* (2006.01)
*G06F 8/73* (2018.01)
*G06F 16/36* (2019.01)

(52) U.S. Cl.
CPC ............... *G06F 9/541* (2013.01); *G06F 8/73* (2013.01); *G06F 9/547* (2013.01); *G06F 16/367* (2019.01)

(58) Field of Classification Search
CPC .......... G06F 8/73; G06F 16/367; G06F 9/541; G06F 9/547
See application file for complete search history.

(56) References Cited

U.S. PATENT DOCUMENTS 6,640,231 B1    10/2003   Anderson et al.
10,579,372 B1 *  3/2020   Bahrami ............ G06K 9/00469
                          (Continued)

OTHER PUBLICATIONS

Written Opinion of the International Preliminary Examination Authority in PCT/US/2018/025815 dated Dec. 11, 2019.
(Continued)

*Primary Examiner* — Brian W Wathen
(74) *Attorney, Agent, or Firm* — Manelli Selter PLLC; Edward Stemberger

(57) ABSTRACT

A service platform for routing intent-based API requests to the most relevant APIs, comprising: a data ingestion subsystem, configured to retrieve API schema definitions and context information from external sources and store them in an API schema library; an ontology mining subsystem, configured to identify ontologies for said stored APIs, cluster the identified ontologies hierarchically and label said hierarchies with meaningful labels; an evaluation subsystem, configured to evaluate a set of APIs based on chosen datasets and metrics or by externally provided quality signals; an API dispatcher subsystem, configured to receive an intent-based request and identify the API schema and API Endpoint that match the request; and an API integration subsystem, configured to receive said intent-based request and said matched API schema and API Endpoint and synthesize an integration code.

20 Claims, 12 Drawing Sheets

(56) References Cited

U.S. PATENT DOCUMENTS

| | | | |
|---|---|---|---|
| 2003/0172368 A1* | 9/2003 | Alumbaugh | G06F 8/71 |
| | | | 717/106 |
| 2005/0125778 A1 | 6/2005 | Fleegal | |
| 2006/0123125 A1 | 6/2006 | Weisman et al. | |
| 2008/0281856 A1 | 11/2008 | Nene et al. | |
| 2011/0113405 A1 | 5/2011 | Guerrera et al. | |
| 2014/0280147 A1 | 9/2014 | Arabshian et al. | |
| 2014/0372963 A1 | 12/2014 | Chandaria et al. | |
| 2016/0026710 A1* | 1/2016 | Laredo | G06F 16/3334 |
| | | | 707/748 |
| 2017/0012838 A1* | 1/2017 | Kashtan | H04L 41/0273 |
| 2017/0093750 A1* | 3/2017 | McBride | H04L 47/762 |
| 2018/0165135 A1* | 6/2018 | Bahrami | G06F 9/541 |
| 2019/0095318 A1* | 3/2019 | Bahrami | G06F 11/3676 |
| 2019/0243642 A1* | 8/2019 | Bahrami | G06F 40/279 |
| 2020/0142674 A1* | 5/2020 | Hernan | G06F 21/577 |

OTHER PUBLICATIONS

International Search Report & Written Opinion in PCT/US18/25815 dated Jun. 26, 2018.

* cited by examiner

INTENT-BASED ORGANISATION OF APIS

CROSS-REFERENCE TO RELATED PATENT APPLICATIONS

This patent application claims priority from and is related to U.S. Provisional Patent Application Ser. No. 62/489,505, filed 25 Apr. 2017, this U.S. Provisional patent application incorporated by reference in its entirety herein.

TECHNICAL FIELD

The present invention relates to a system and a method for searching for an intent-based API (Application Programming Interface) and providing a synthesized integration code for using an API matching the intent parameters.

BACKGROUND

An Application Programming Interface (API) is a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. Watson Language Translator REST API, POSIX, Microsoft Windows API, the C++ Standard Template Library and Java APIs are examples of different forms of APIs. Documentation for the API is usually provided to facilitate usage.

A web API may have a plurality of endpoints. A single endpoint may have multiple free parameters of many potential values for different use-cases. Understanding the intention of the user ("intent")—what they are trying to accomplish—provides an opportunity to tailor the API to the specific use by identifying a proper endpoint and binding some of the parameters to fixed values.

One intent may be implemented using a variety of the APIs. Tailoring all those APIs to this intent makes them look similar to a user. It allows for performing evaluation of those APIs towards the intent and its fulfillment context and enables users to access multiple APIs similarly and use each of them in the context where it performs the best.

SUMMARY

According to a first aspect of the present invention there is provided a service platform for routing intent-based API (Application Programming Interface) requests to the most relevant APIs, comprising:
 a data ingestion subsystem, configured to retrieve API schema definitions and context information from external sources and store them in an API schema library;
 an ontology mining subsystem, configured to identify ontologies for said stored APIs, cluster the identified ontologies hierarchically and label said hierarchies with meaningful labels;
 an evaluation subsystem, configured to evaluate a set of APIs based on chosen datasets and metrics or by externally provided quality signals;
 an API dispatcher subsystem, configured to receive an intent-based request and identify the API schema and API Endpoint that match the request; and
 an API integration subsystem, configured to receive said intent-based request and said matched API schema and API Endpoint and synthesize an integration code.

The external sources may be selected from the group consisting of: documents on the internet or intranet and API management companies.

The data ingestion subsystem may comprise:
 an API extraction module, configured to identify API schemas in text documents;
 an API Schema Lookup module, configured to checks whether an identifies API schema has a corresponding API Schema in the API Schema Library;
 an API Schema Updater module, configured to update an API in the API schema library with new data from the text document;
 an API Host Discovery Module, configured to discover physical instances of the API Schema addressable via the Internet or Intranet;
 an API Endpoints Library storing all known endpoints for discovered APIs;
 an API Data Enrichment Module, configured to perform API schema enrichment using of external services;
 a data Ingestion Monitoring module, configured to monitor the data ingestion pipeline and produce visualizations, alerts and system checks to detect whether all parts of the pipeline function correctly; and
 a Web Server comprising a representational layer of the system.

The API Host Discovery Module may comprise:
 an API Host Library, storing all known physical instances of the API Schemas;
 an API Host Extractor module, configured to extract API host from said text documents; and
 an API Host Probe module, configured to probe network hosts to check for the presence of any addressable API.

The API Host Extractor module may comprise an API Host Text Model sub-module, configured to extract host from text document.

The API Host Probe may comprise an API Host Probe Model sub-module, configured to determine if some URL:port is an API host.

The API Data Enrichment Module may comprises:
 an API Schema Context database storing all relevant information related to an API found on external services;
 an API Enrichment module, configured to find mentions of the API in other text documents and stores them in the API Schema Context database; and
 an API Presentation module, configured to process API Enrichment data from said API Schema Context database to achieve proper presentation of the API in an API Catalog.

The Web Server may comprise:
 an API Catalog Web UI module comprising a web interface, configured to allow end-users to navigate through a catalog of the APIs; and
 an API Catalog Backoffice UI module comprising a web interface, configured to allow system administrators interaction with parts of the process.

The ontology mining subsystem may comprise:
 an API Ontology Extraction module, configured to build an ontology for a single API;

an API Ontology Hierarchical Clustering module, configured to hierarchically cluster API Ontologies to achieve Latent Intents Hierarchies and sub-Hierarchies;

an Intent Ontology Mining module, configured to build ontologies for discovered hierarchies of intents; and an Ontology Labeling module, configured to label the Intent ontologies with meaningful names.

The Intent Ontology Mining module may comprise a General Ontology Building module, configured to build a general ontology for all APIs in some intent, based on clustering of previously extracted API Ontologies.

The General Ontology Building module may be configured to one of: update an existing API Ontology and/or cluster and build a new Intent Ontology.

The API Ontology Extraction module may comprise:
a general Language Ontology that describes the general knowledge of the world;
an API Ontology Library storing all extracted API Ontologies; and
an API Ontology Extractor module, configured to construct and update the API Ontology for a particular API, based on the API Schema, General Language Ontology and API Enrichment Data.

The ontology mining subsystem may be connected with at least one general language ontology source.

The ontology mining subsystem may comprise:
API Ontology Extraction module, configured to build an ontology for a single API;
API Ontology Hierarchical Clustering module, configured to cluster API ontologies hierarchically;
intent ontology mining module, configured to builds ontologies for discovered hierarchies of intents; and
ontology labeling module, configured to label intent ontologies with meaningful labels.

The evaluation subsystem may comprise:
Evaluation Datasets, developed for intent fulfillment evaluation;
Evaluation Result Storage, configured to store evaluation dataset processing results, performance feedback, intermediate and final metrics;
Performance Feedback Collection module, configured to collect performance feedback from intent consumers and store them in the Evaluation Result Storage;
Intent Execution module, configured to run evaluation datasets through selected intents and providers using the API integration subsystem and store all relevant results and technical metrics in the Evaluation Result Storage;
Metrics Calculation module, configured to calculate quality metrics and their statistical significance and store them in the Evaluation Result Storage;
Reference Model Building module, configured to build reference models for APIs; and
Reference Model Storage, configured to store Reference models.

The reference models may be selected from the group consisting of: Category-based models and AI-based models.

According to a second aspect of the present invention there is provided a method of routing intent-based API (Application Programming Interface) requests to the most relevant APIs, comprising:
retrieving API schema definitions and context information from external sources and storing them in an API schema library;
identifying ontologies for said stored APIs, clustering the identified ontologies hierarchically and labeling said hierarchies with meaningful labels;
receiving an intent-based request and identifying the API schema and API Endpoint that match the request; and
synthesizing an integration code.

The external sources may be selected from the group consisting of: documents on the internet or intranet and API management companies.

The retrieving API schema definitions and context information may comprise:
identifying API schemas in text documents;
checking whether an identifies API schema has a corresponding API Schema in the API Schema Library;
updating an API in the API schema library with new data from the text document;
discovering physical instances of the API Schema addressable via the Internet or Intranet;
storing all known endpoints for discovered APIs;
performing API schema enrichment using external services; and
monitoring the data ingestion pipeline and producing visualizations, alerts and system checks to detect whether all parts of the pipeline function correctly.

The discovering physical instances of the API may comprise:
extracting API host from said text documents; and
probing network hosts to check for the presence of any addressable API.

The probing may comprise determining if some URL:port is an API host.

The performing API schema enrichment may comprise:
finding mentions of the API in other text documents and storing them in the API Schema Context database; and
processing API Enrichment data from said API Schema Context database to achieve proper presentation of the API in an API Catalog.

The identifying ontologies for said stored APIs may comprise:
building an ontology for a single API;
hierarchically clustering API Ontologies to achieve Latent Intents Hierarchies and sub-Hierarchies;
building ontologies for discovered hierarchies of intents; and
labeling the Intent ontologies with meaningful names.

The method may further comprise building a general ontology for all APIs in some intent, based on clustering of previously extracted API Ontologies.

The building a general ontology may comprise updating an existing API Ontology and/or cluster and building a new Intent Ontology.

The identifying the API schema and API Endpoint that match the request may comprise one of a monologue mode and a dialogue mode.

The monologue mode may comprise:
interpreting the Intent Parameters within the Intent Ontology and finding one or more API Schema with corresponding endpoints that can fulfill the request given said Intent Parameters;
ranking said found one or more API Schema with the hosts associated with said retrieved endpoints.

The ranking may comprise using at least one of evaluation data sets processing results and performance feedback collected from users.

The ranking may comprise using a user's bidding strategy.

The method may further comprise filtering said found one or more API Schema to satisfy additional explicit or implicit constraints.

The dialogue mode may comprise identifying missing Intent Parameters.

The identifying the API schema and API Endpoint that match the request may comprise ensembling results of multiple APIs.

The identifying the API schema and API Endpoint that match the request may comprise performing fallback to a next provider in the case of provider unavailability.

The identifying the API schema and API Endpoint that match the request may comprise harmonizing features of said identified API schema by adding features.

The adding features may comprise one of adding from another API and adding from system components.

The synthesizing an integration code may comprise:
translating Intent Parameters from the Intent Ontology to the API Schema Ontology;
performing the request to the API Host;
receiving an answer from the API; and
translating the answer back to the Intent Ontology.

The synthesizing an integration code may be performed in one of a centralized mode and a decentralized mode.

In the centralized mode said synthesizing an integration code may run on a cloud integration subsystem communicating bi-directionally with addressable API endpoints and with a system running on a client device.

The decentralized mode may comprise:
invoking an intent method in a system SDK running on a client computer;
building synthesized Integration Code by said system SDK;
translating the intent parameters into parameters of a particular API;
making a direct request to said particular API Endpoint;
receiving an answer; and
translating it back to intent return parameters.

According to a third aspect of the present invention there are provided one or more computer storage media having stored thereon multiple instructions that, when executed by one or more processors of a computing device, cause the one or more processors to:
retrieve API schema definitions and context information from external sources and storing them in an API schema library;
identify ontologies for said stored APIs, cluster the identified ontologies hierarchically and label said hierarchies with meaningful labels;
receive an intent-based request and identifying the API schema and API Endpoint that match the request; and
synthesize an integration code.

According to another aspect of the present invention there is provided an API data ingestion system, configured to retrieve API schema definitions and context information from external sources and store them in an API schema library, comprising:
an API extraction module, configured to identify API schemas in text documents;
an API Schema Lookup module, configured to checks whether an identified API schema has a corresponding API Schema in the API Schema Library;
an API Schema Updater module, configured to update an API in the API schema library with new data from the text document;
an API Host Discovery Module, configured to discover physical instances of the API Schema addressable via the Internet or Intranet;
an API Endpoints Library storing all known endpoints for discovered APIs;
an API Data Enrichment Module, configured to perform API schema enrichment using external services;
a data Ingestion Monitoring module, configured to monitor the data ingestion pipeline and produce visualizations, alerts and system checks to detect whether all parts of the pipeline function correctly; and
a Web Server comprising a representational layer of the system.

The API Host Discovery Module may comprise:
an API Host Library, storing all known physical instances of the API Schemas;
an API Host Extractor module, configured to extract API host from said text documents; and
an API Host Probe module, configured to probe network hosts to check for the presence of any addressable API.

The API Host Extractor module may comprise an API Host Text Model sub-module, configured to extract host from text document.

The API Host Probe may comprise an API Host Probe Model sub-module, configured to determine if some URL:port is an API host.

The API Data Enrichment Module may comprise:
an API Schema Context database storing all relevant information related to an API found on external services;
an API Enrichment module, configured to find mentions of the API in other text documents and stores them in the API Schema Context database; and
an API Presentation module, configured to process API Enrichment data from said API Schema Context database to achieve proper presentation of the API in an API Catalog.

The Web Server may comprise:
an API Catalog Web UI module comprising a web interface, configured to allow end-users to navigate through a catalog of the APIs; and
an API Catalog Backoffice UI module comprising a web interface, configured to allow system administrators interaction with parts of the process.

According to another aspect of the present invention there is provided a method of retrieving API schema definitions and context information from external sources and storing them in an API schema library, comprising:
identifying API schemas in text documents;
checking whether an identified API schema has a corresponding API Schema in the API Schema Library;
updating an API in the API schema library with new data from the text document;
discovering physical instances of the API Schema addressable via the Internet or Intranet;
storing all known endpoints for discovered APIs;
performing API schema enrichment using external services; and
monitoring the data ingestion pipeline and producing visualizations, alerts and system checks to detect whether all parts of the pipeline function correctly.

The discovering physical instances may comprise:
storing all known physical instances of the API Schemas;
extracting API host from said text documents; and
probing network hosts to check for the presence of any addressable API.

The performing API schema enrichment may comprise:
  storing all relevant information related to an API found on external services;
  finding mentions of the API in other text documents and storing them in the API Schema Context database; and
  processing API Enrichment data from said API Schema Context database to achieve proper presentation of the API in an API Catalog.

According to another aspect of the present invention there is provided an API ontology mining system, comprising:
  an API Ontology Extraction module, configured to build an ontology for a single API;
    an API Ontology Hierarchical Clustering module, configured to hierarchically cluster API Ontologies to achieve Latent Intents Hierarchies and sub-Hierarchies;
    an Intent Ontology Mining module, configured to build ontologies for discovered hierarchies of intents; and
      an Ontology Labeling module, configured to label the Intent ontologies with meaningful names.

The Intent Ontology Mining module may comprise a General Ontology Building module, configured to build a general ontology for all APIs in some intent, based on clustering of previously extracted API Ontologies.

The General Ontology Building module may be configured to one of: update an existing API Ontology and/or cluster and build a new Intent Ontology.

The API Ontology Extraction module may comprise:
  a general Language Ontology that describes the general knowledge of the world;
  an API Ontology Library storing all extracted API Ontologies; and
  an API Ontology Extractor module, configured to construct and update the API Ontology for a particular API, based on the API Schema, General Language Ontology and API Enrichment Data.

The ontology mining subsystem may be connected with at least one general language ontology source.

The ontology mining subsystem may comprise:
  API Ontology Extraction module, configured to build an ontology for a single API;
  API Ontology Hierarchical Clustering module, configured to cluster API ontologies hierarchically;
  intent ontology mining module, configured to builds ontologies for discovered hierarchies of intents; and
  ontology labeling module, configured to label intent ontologies with meaningful labels.

According to another aspect of the present invention there is provided a method of API ontology mining, comprising:
  building an ontology for a single API;
  hierarchically clustering API Ontologies to achieve Latent Intents Hierarchies and sub-Hierarchies;
  building ontologies for discovered hierarchies of intents; and
  labeling the Intent ontologies with meaningful names.

The method may further comprise building a general ontology for all APIs in some intent, based on clustering of previously extracted API Ontologies.

The building a general ontology may comprise one of: updating an existing API Ontology and/or clustering and building a new Intent Ontology.

The building an ontology for a single API may comprise constructing and updating the API Ontology for a particular API, based on the API Schema, General Language Ontology and API Enrichment Data.

According to another aspect of the present invention there is provided a system for evaluating a set of APIs based on chosen datasets and metrics or by externally provided quality signals, comprising:
  Evaluation Datasets, developed for intent fulfillment evaluation;
  Evaluation Result Storage, configured to store evaluation dataset processing results, performance feedback, intermediate and final metrics;
  Performance Feedback Collection module, configured to collect performance feedback from intent consumers and store them in the Evaluation Result Storage;
  Intent Execution module, configured to run evaluation datasets through selected intents and providers using an API integration subsystem and store all relevant results and technical metrics in the Evaluation Result Storage;
  Metrics Calculation module, configured to calculate quality metrics and their statistical significance and store them in the Evaluation Result Storage;
  Reference Model Building module, configured to build reference models for APIs; and
  Reference Model Storage, configured to store Reference models.

The reference models may be selected from the group consisting of: Category-based models and AI-based models.

According to another aspect of the present invention there is provided a method of evaluating a set of APIs based on chosen datasets and metrics or by externally provided quality signals, comprising:
  Evaluation Datasets, developed for intent fulfillment evaluation;
  storing processing results of intent fulfillment evaluation dataset, performance feedback, intermediate and final metrics;
  collecting performance feedback from intent consumers and storing them;
  running evaluation datasets through selected intents and providers and storing all relevant results and technical metrics;
  calculating quality metrics and their statistical significance and storing them;
  building reference models for APIs; and
  storing said Reference models.

The reference models may be selected from the group consisting of: Category-based models and AI-based models.

According to another aspect of the present invention there is provided an API Dispatcher system, comprising:
  a Request Processing module, configured to receive an intent-based request and interpret the Intent Parameters within the Intent Ontology;
  an API Lookup module, configured to find one or more API schema and API Endpoint that can fulfill the request given said Intent Parameters or parameters derived from the request data;
  an API Filtering module, configured to filter said found API Schemas and API Endpoints to satisfy additional explicit or implicit constraints;
  an API Ranking module, configured to rank said found one or more API Schemas and API Endpoints using Reference Models and user bidding strategy;
  an Ensembling Planning module, configured to plan multiple-API execution and synthesize aggregated result.

The Request Processing module may comprise: a Monologue Request Processing sub-module; and a Dialogue Request Processing sub-module.

According to another aspect of the present invention there is provided an API Cloud Integration system comprising:

Intent to API Translation module configured to obtain API intent request parameters and obtains API request parameters;

Transport Protocol Gateway configured to perform API request to receive Addressable API Endpoint;

API to Intent Translation module configured to translate the result of said API request to Intent Context.

According to another aspect of the present invention there is provided an API Integration system comprising:

SDK (Software Development Kit) plugged into a user application, said SDK configured to:

receive intent-based API request from said user application; and determine whether fresh synthesized integration code is required to be downloaded; and an API Integration Code Synthesis module configured to receive said fresh integration code and build a synthesized code if such code has been determined to be required;

wherein the Synthesized Code comprises:

Intent to API Translation Code, configured to translates the intent parameters into parameters of a particular API;

API to Intent Translation Code, configured to translates API call results back to the Intent return parameters; and Transport Protocol Gateway Code configured to communicate with a chosen API by making the direct request to the API Endpoint, receiving answer and returning the result to the user application.

The Synthesized Integration Code may comprise a set of constraints that define if the subsequent requests can use the same integration code or a new one should be synthesized and downloaded to the SDK.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
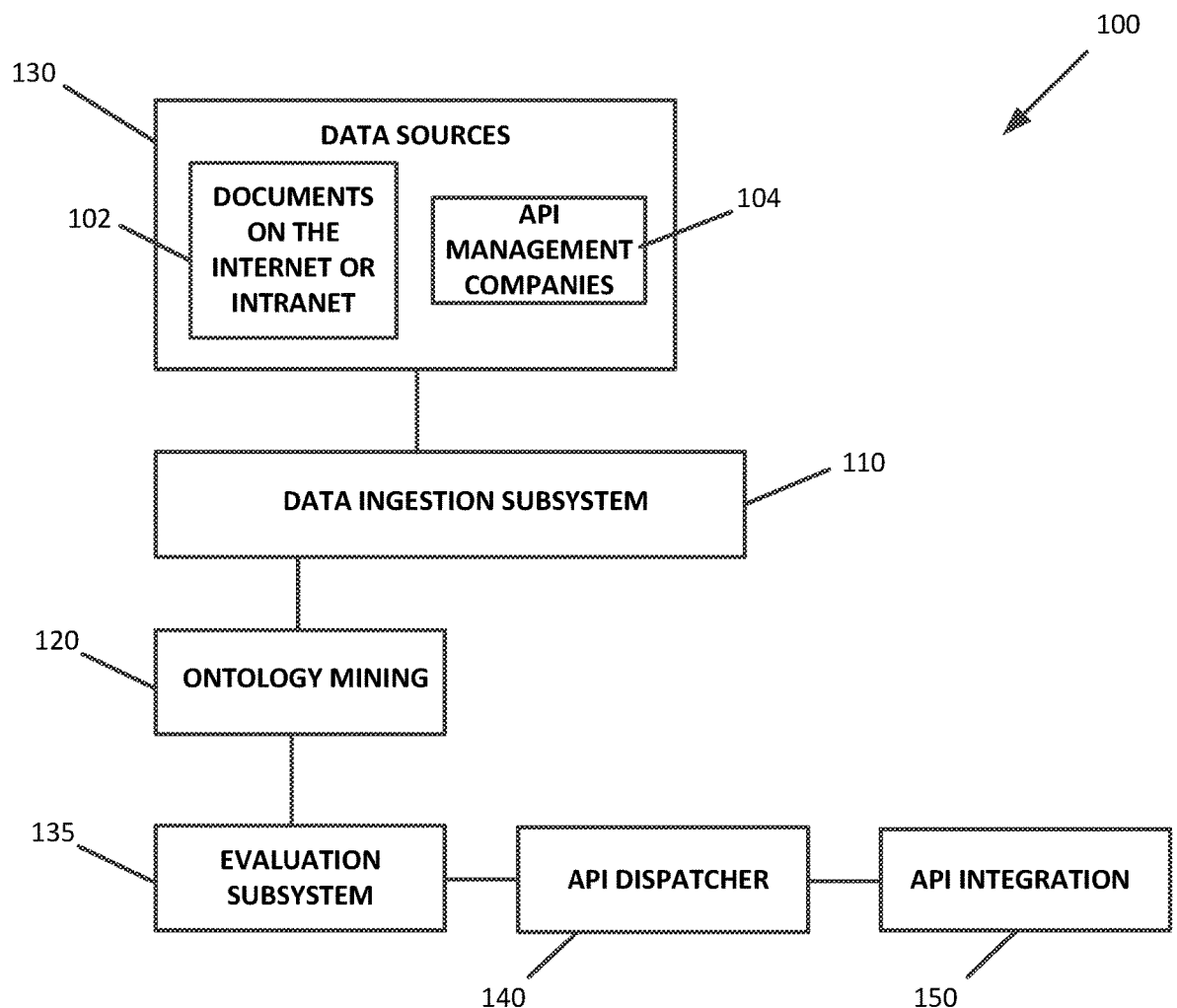
FIG. 1 is a schematic representation of the system according to the present invention.

As will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments herein may be written in any combination of one or more programming languages, including an object oriented programming language such as Java, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The operations and algorithms described herein can be implemented as executable code within the micro-controller or control device having processor circuit, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit.

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Glossary

API—Application Programming Interface

API Schema definition—a set of rules that is sufficient to send requests to the API API Endpoint—an access point to the instance of the API API Ontology—a set of 1) parameters together with their description, inter-relation and constraints, that describe the context of the API request (does not necessarily include the intent itself, which may be latent), and 2) return values together with their description, inter-relation and constraints.

Intent—a broad class of goals that is reached by requesting some API (example—transportation, meaning getting from point A to point B). The intents are organized hierarchically, i.e. there may be a set of detailed intents that relate to the same general intent (e.g. taxi, flight and train are sub-intents of the general transportation intent).

Intent Ontology—a complete set of parameters together with their description, inter-relation and constraints that describe the context of some intent. Example: for the Transportation intent, "from", "to", "departure time", "arrival time", "vehicle type" are all elements of the intent ontology.

Intent Context—a list of values for the parameters comprising the Intent Ontology Intent-Based Request—is a request that specifies the intent and a set of values for the parameters from the Intent Ontology; that is, the Intent-based request defines a subset of all possible Intent Contexts.

Vertical—a broad class of goals, grouped by some domain of activity (e.g. travel, finance, etc) May contain multiple intents.

The present invention provides a service platform that routes intent-based requests to the most relevant APIs and delivers the APIs responses back to its users. The platform employs an intent-based categorization of APIs and a rich intent ontology index.

The platform provides tools for the following categories of users:

Software developers/API consumers:
  Programmatic intent-based discovery of public or private API.
  Automatic connection to the discovered APIs with an ability to make requests and receive results.
  Smart routing of user request to the appropriate APIs given a set of constraints and quality estimations.
API Management companies/API producers:
  Automatic crawling and indexing API endpoints available on the Internet.
  Enrichment of the API information using 3rd party sources (documentation, code snippets, source code, live interaction)
  Lead generation by routing requests from applications using the Platform to the API connected to the Platform.

FIG. 1 is a schematic representation of the system 100 according to the present invention, comprising:
  API related data sources 130, such as documents on the internet or intranet 102, API management companies 104 and others,
  Data ingestion subsystem 110,
  Ontology mining subsystem 120,
  Evaluation subsystem 135,
  API dispatcher subsystem 140,
  API integration subsystem 150.

The system 100 may be realized as a single system incorporating all the above components or as independent subsystems, depending on the system's intended use.

Figure 2:
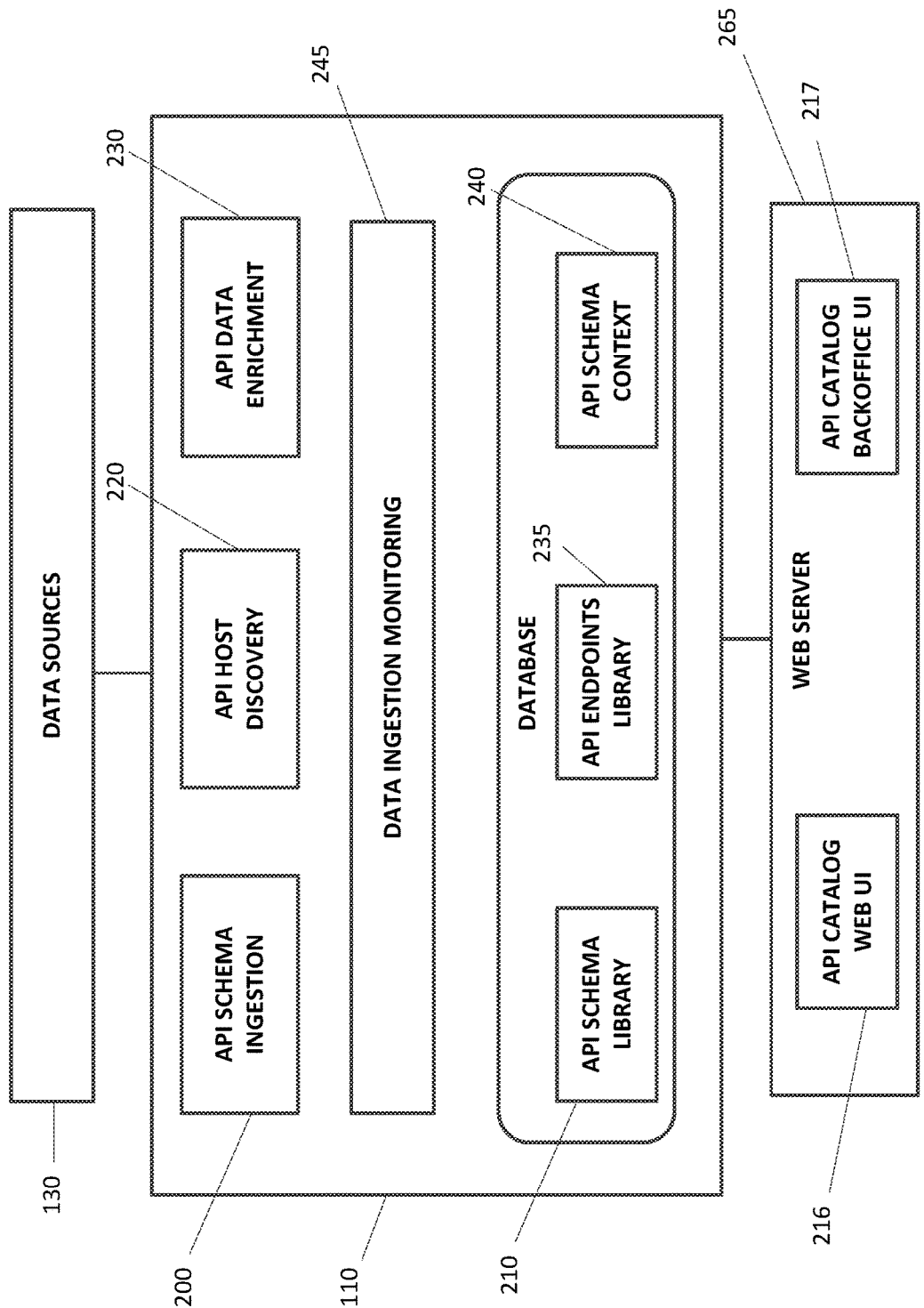
FIG. 2 is a schematic representation of the data ingestion subsystem according to the present invention.

FIG. 2 is a schematic representation of the data ingestion subsystem 110 according to the present invention, comprising:
  i. An API schema ingestion module 200, which performs two tasks:
    Searches for new API URL schema definitions on the Internet or the Intranet and adds them to the API schema library 210,
    Searches for mentions of API schema definitions from the API schema library and extracts additional context information about those APIs.
  ii. An API schema library 210, which stores all known API schema definitions.

Figure 2A:
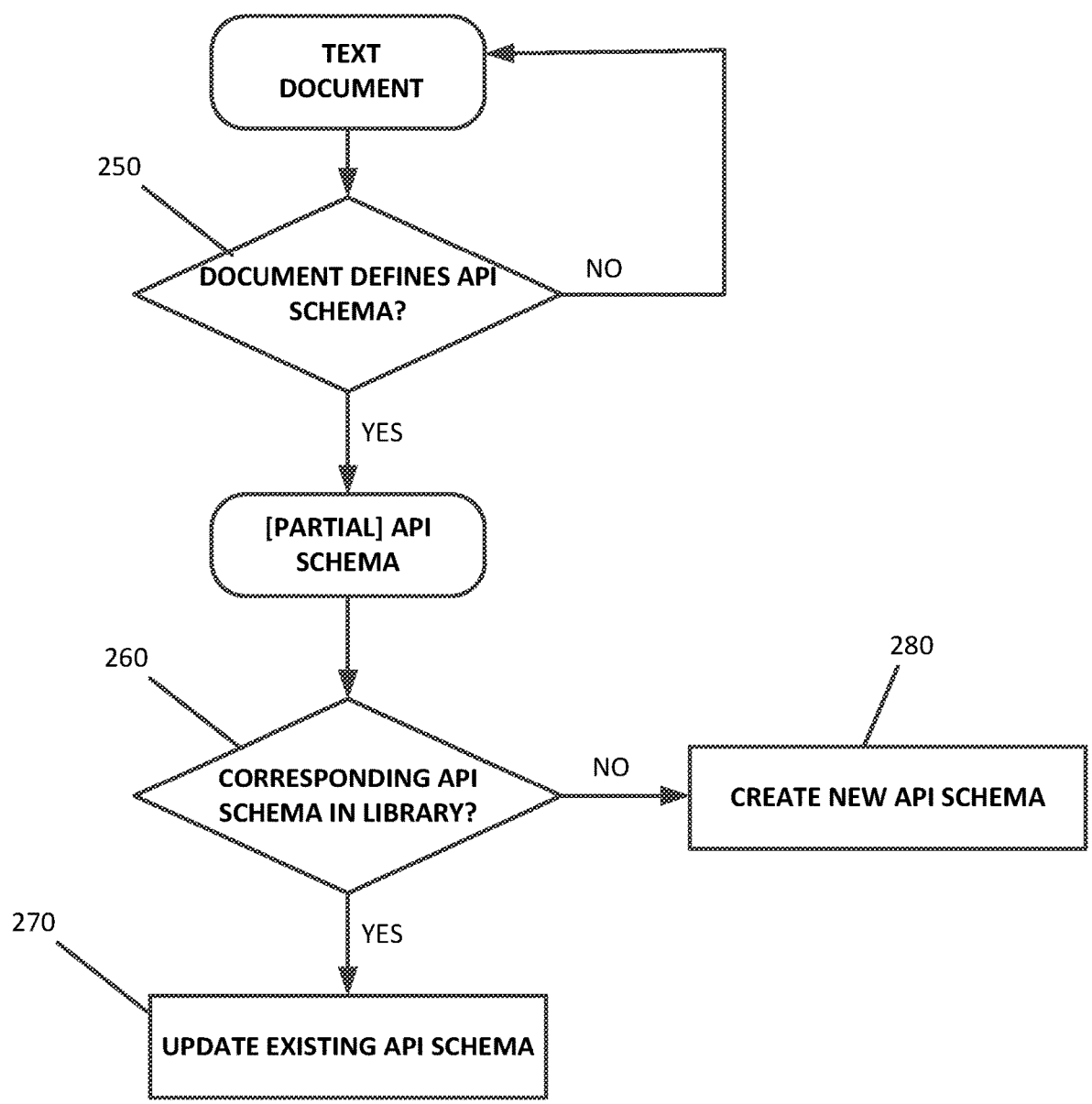
FIG. 2A is a flowchart showing the steps taken by the API schema ingestion module.

FIG. 2A is a flowchart showing the steps taken by the API schema ingestion module 200:

In step 250, the system receives a text document and uses an API Schema Extractor software module to identify if the text document defines an API Schema in some way.

In step 260, if an API schema has been detected in the document, an API Schema Lookup software module receives (potentially incomplete) API Schema from the API Schema Extractor and checks whether a corresponding API Schema exists in the API Schema Library.

Figure 3:
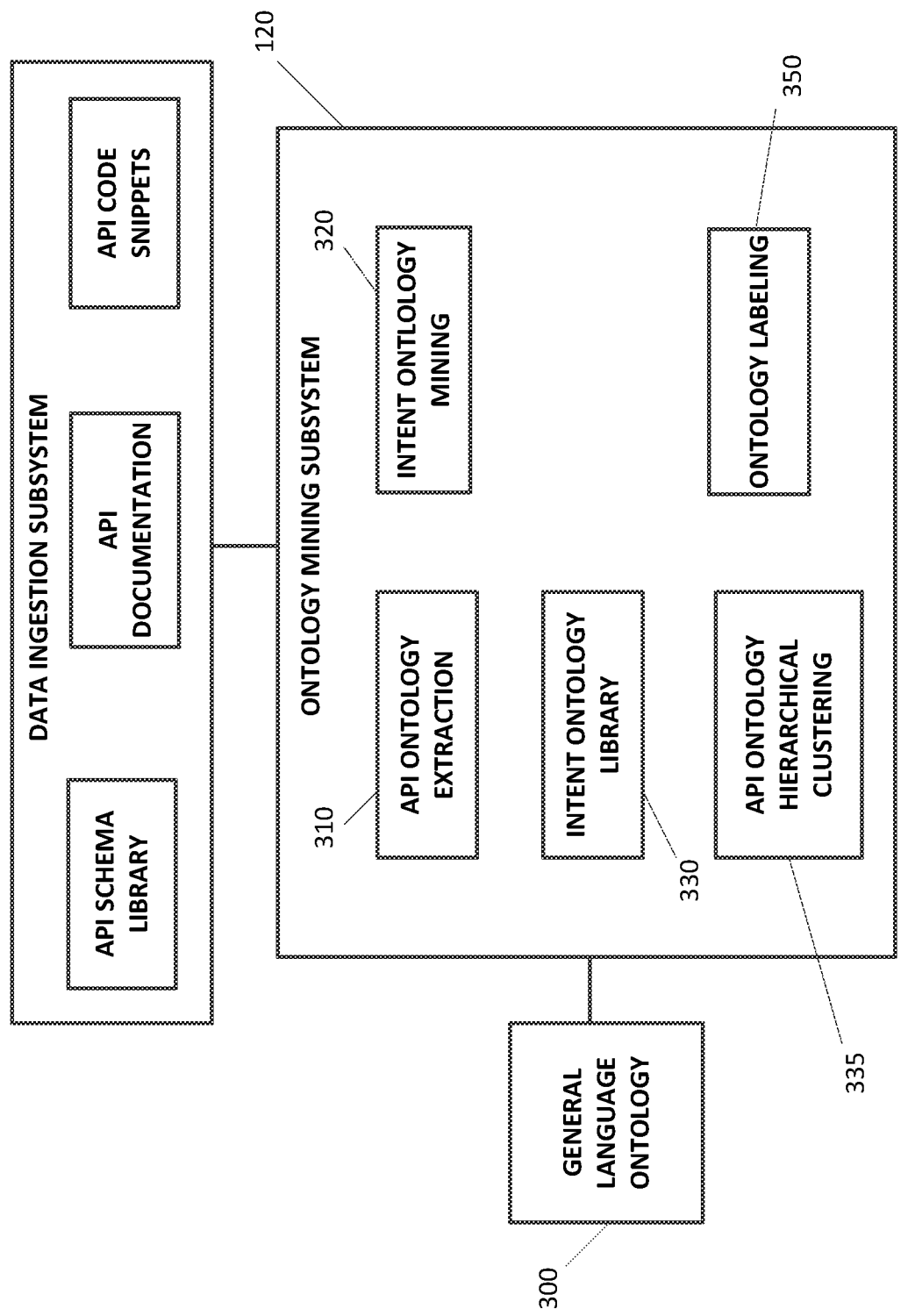
FIG. 3 is a schematic representation of the Ontology Mining subsystem according to the present invention.

If a corresponding API schema has been found, an API Schema Updater module updates the API in the API schema library with new data from the document (step 270). Otherwise a new API Schema is created in the API schema library (step 280).

iii. An API Host Discovery Module 220, which discovers physical instances of the API Schema addressable via Internet or Intranet. It may use both crawling text documents to find host URL mentions and network probing. For the latter case, it takes typical network ports and protocols either from the API Schema definition or builds the API Host Probe model based on the known endpoints.
  The API Host Discovery Module 220 comprises:
    API Host Library—which stores all known physical instances of the API Schemas.
    API Host Extractor—A software module which extracts API Host from texts. Texts can be any document crawled from the internet, web or native application, recorded network traffic or logs.
    The API Host Extractor includes an API Host Text Model sub-module which knows how to extract host from text document (e.g. docs).
    API Host Probe—A software module which probes network hosts to check for the presence of any addressable API at the specific host.
    The API Host Probe uses an API Host Probe Model as a sub-module capable of determining if some URL:port is an API host.
  iv. API Endpoints Library 235—a database which stores all known endpoints for discovered APIs.
  v. An API Data Enrichment Module 230, which performs the task of API schema enrichment by means of external services (e.g. blogs, discussion lists, Q&A sites).
  The API Data Enrichment Module 230 comprises:
    API Schema Context database 240—A database which stores all relevant information related to an API found on external services.
    API Enrichment module—A software module which finds mentions of the API in other text documents (source code repositories, social networks, discussion forums etc) and stores them in the API Schema Context database 240.
    API Presentation Module—A software module which processes API Enrichment Data from the API Schema Context database to achieve proper presentation of the API in the API Catalog.
  vi. Data Ingestion Monitoring 245 is a service subsystem to monitor the data ingestion pipeline and produce visualizations, alerts and system checks to detect whether all parts of the pipeline function correctly.
  vii. Web Server 265 is a representational layer of the system. It comprises:
    a. API Catalog Web UI 216—a web interface for end-users to navigate through the catalog of the APIs
    b. API Catalog Backoffice UI 217—a web interface for administrators of the systems to allow interaction with the parts of the process FIG. 3 is a schematic representation of the Ontology Mining subsystem 120 according to the present invention.

The ontology mining subsystem 120 performs the following tasks for APIs stored in the API schema library 210:
1. The General Language Ontology 300 is used to identify the ontology of a particular API.
2. The API Ontologies are clustered hierarchically to achieve latent intents hierarchy.
3. General Intent Ontologies (ontologies of the intents in the real worlds) are built for discovered intent hierarchy and each level of the hierarchy is labeled with a meaningful label, where possible.

With each new API added to the system, a decision is taken whether the API fits some intent completely, or a new intent should be added to the Intent Ontology Library.

The ontology mining subsystem 120 comprises:
i. An API Ontology Extraction subsystem 310, which build an ontology for a single API.

The API Ontology Extraction subsystem 310 comprises:
General Language Ontology 300—An ontology that describes the "common sense", general knowledge of the world, model of the world.
API Ontology Library that stores all extracted API Ontologies.
API Ontology Extractor—A module which is responsible for constructing and updating the API Ontology for the particular API based on the API Schema, a General Language Ontology 300 and API Enrichment Data 230 (e.g. text documentation).
ii. API Ontology Hierarchical Clustering 335—A software module which groups API Ontologies into so called verticals. The API Ontologies are clustered hierarchically here to achieve Latent Intents Hierarchies. Intents are decomposed into a hierarchy of sub-intents with overlapping ontologies.
iii. Intent Ontology Mining 320—A software module which builds ontologies for discovered hierarchies of intents.

The Intent Ontology Mining module comprises a module which builds a general ontology for all APIs in some intent, based on grouping of previously extracted API Ontologies.

The module can work in an update mode; when given an updated set of API Ontologies and/or Verticals, it decides whether to build a new Intent Ontology or to update an existing one.
iv. Ontology Labeling 350—A software module which labels the Intent ontologies with meaningful (human-readable) names.

Figure 4:
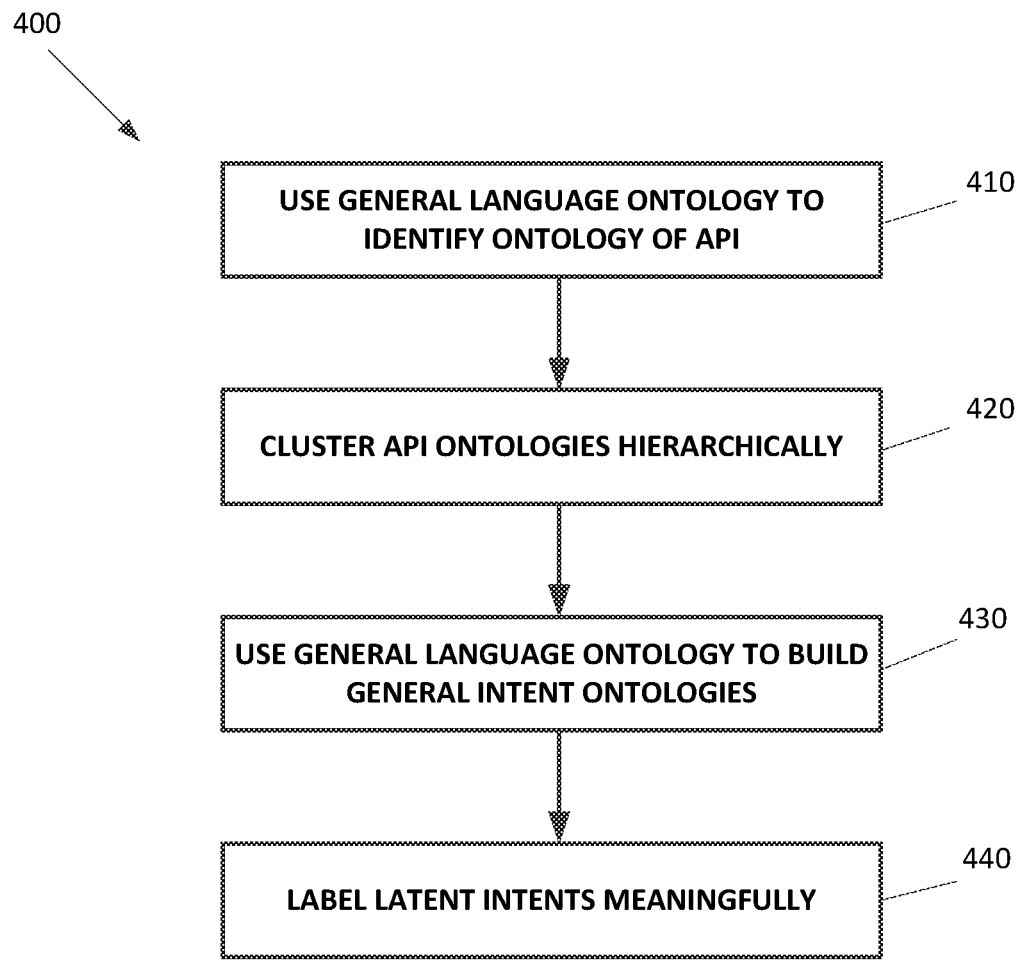
FIG. 4 is a general flowchart showing the steps taken by the ontology mining subsystem.

FIG. 4 is a general flowchart 400 showing the steps taken by the ontology mining subsystem:

Step 410—The General Language Ontology is used to identify ontology or sub-ontology that describes parameters of the particular API.

Step 420—The API Ontologies are clustered hierarchically to achieve Latent Intents Hierarchy Step 430—The General Language Ontology is used to build General Intent Ontologies (ontologies of the intents in real world) where possible.

Step 440—The General Intent Ontologies are used to label Latent Intents with meaningful labels, where possible.

With the each new API added to the system, a decision is taken whether the API fits some intent completely, or there is need to add a new intent or sub-intent to the Intent Ontology Library.

Constructing the API Ontology

API Ontology is a set of 1) parameters together with their description, inter-relation and constraints, that describe the context of the API request (does not necessarily include the intent itself, which may be latent), and 2) return values together with their description, inter-relation and constraints.

Upon data ingestion and API schema extraction by Data Ingestion Subsystem 110, the system has a variety of information on each API.

This information may contain (but not limited to):
API endpoint(s) with their names, descriptions and examples
Parameters, including names, types, descriptions, allowed values and examples
Parameter interrelations presented in any formal way or using a natural language
Return values, including names, types, descriptions, possible values and examples
Documentation and text description of the API and its methods
Code examples In different programming languages The Ontology Mining Subsystem 120 builds an ontology for a particular API. The result is a filled (or partially-filled) API ontology record.

Figure 5:
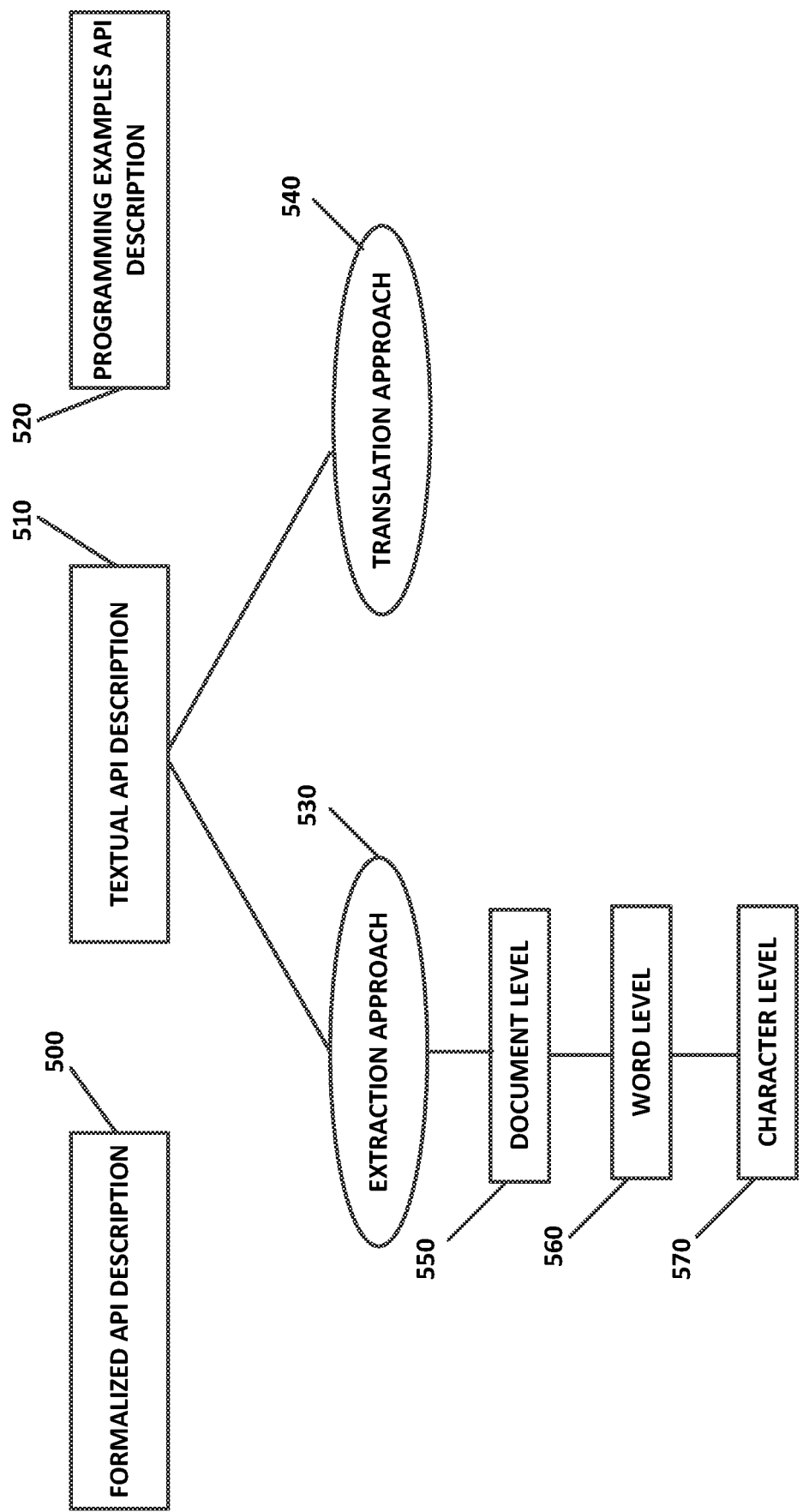
FIG. 5 represents the process of constructing an API ontology.

The process of constructing an API ontology is represented in FIG. 5, where the API may be described in one of three manners:
API has a Formalized Description 500:
In the case an API has a formalized description in any format (i.e. OpenAPI/Swagger, API Blueprint, RAML, etc) the algorithm extracts the relevant information from such a description and stores it in the API Ontology Library.

This does not limit the algorithm from using other sources (like unstructured text documents and code examples) for enriching such a record.

API has Textual Descriptions 510:
In the case when documentation for the API or text descriptions exist, the algorithm works with natural language sources.

The system may use two completely different approaches: extraction approach 530 and translation approach 540.

Extraction Approach 530

There are three levels of processing in this approach. Each one generates a set of features used to extract elements of an API ontology and/or used for subsequent intent extraction.

Document-Based Level Processing 550

Based on the whole collection of documents related to all APIs the algorithm determines:
i. Topics of the texts (using topic modeling or any other algorithm capable to extract the semantic kernel of a document); it could be information retrieval algorithms which operate on TF*IDF weights; neural network which generates a short keyword description for a long text or collection of texts; a machine learning classifier which operates on a large dictionary; or any other relevant method.
ii. Vector embedding which produces a float-valued vector representing the content of the document in a special semantic space. This can be done using methods such as doc2vec neural model, or any other method capable to "compress" the unstructured or semi-structured text data into a space with the distance metric which preserves semantic relationships.
iii. Set of classes or domains to which the texts belong. This can be done using machine learning classifiers that mark texts by probability of belonging to predetermined categories. Classes can be mutually exclusive (multi-class classification) or not exclusive (multi-label classification). Another option can be a set of rules (handmade or automatically-generated) that classify texts based on lexical content or any other relevant features.

This can be used as additional features for subsequent steps or other levels of processing.

Word-Level Processing 560

The algorithm determines which words or word combinations could represent the ontology entities.

The algorithm uses document-level and word-level features to mark relevant text elements as parameter names, values, return values, constraints, descriptions, and other components of an API ontology. Such an algorithm can be a machine learning classifier, handmade or automatically-created linguistic rule, or any other algorithm which can mark specific text tokens as potential API ontology entities.

Relevant features for the algorithm can include (but not limited to):

i. Word weights, built using techniques from the document-level processing or any other relevant options (like mutual information, TF*IDF weights, or any other suitable algorithm which returns a float value for a given word).

ii. Word annotations constructed from natural language ontologies or dictionaries, or relations to other concepts using general language ontology.

iii. Word embeddings like word2vec or any other model capable to represent words in a space with the distance metric which preserves semantic relationships.

iv. Document-related features obtained at the document-based processing level. For example a category or domain of the text can be a relevant feature.

v. Features from the character-level models (see below). For example we can use a distance to entity-related position as an additional feature for a word-based model.

Character-Level Processing

The character level processing can produce additional features for word-based processing. Such an algorithm marks the positions in the text related to important words, which is used as an additional feature for the classifiers in the word-level processing. Here we can use any sequence processing algorithm that accepts a text as a sequence of characters and marks positions in the text as relevant to ontology related entities.

Translation Approach 540

A completely different (but not mutually exclusive) approach to API ontology extraction from natural language texts is an approach which resembles machine translation.

Here we have a set of texts (possibly enriched with features as described above) as the input, and a formalized description of the API, or a set of API ontology elements, as the output. The algorithm learns to translate an input into output.

Suitable set of algorithms includes (but not limited to) seq2seq algorithms based on neural networks.

API has Examples in Programming Languages 520:

In the case when API usage examples are available, endpoint names, parameter and return value names and types are extracted from the program source code.

Types are inferred from the programming language (if possible). Allowed values are extracted from the code if possible.

String values are treated as natural language (NL) words, in connection with respective parameters. Names are treated as NL words as well (except in the case when they are non-meaningful, like 'a', 'b', 'var1' or alike). All NL-like values (names, string values, important words, etc) are processed using the word and character-level methods described above to determine whether they can represent an API ontology entity.

Additionally the algorithm can create a dependency graph for extracted entities based on their dependence in the program source code. For example if a variable called destination is constructed by a function the inputs of which are variables containing longitude and latitude, then the 'destination' entity is dependent on 'latitude' and 'longitude' entities.

Clustering API Ontologies, Determining Meaningful Verticals and Intents, and Building Intent Ontologies Before clustering, each API ontology is represented as a vector. The vector contains (but is not limited to) features like parameter names (enriched by ontology and embeddings), values and constraints, embeddings for text descriptions.

The hierarchical intent ontology mining & clustering sub-module 320 determines group of APIs that represent the same intent.

These groups are identified using hierarchical agglomerative clustering or any method of "hard" clustering which allows for an API to be assigned to a set of groups arranged in a hierarchy. The algorithm can stop joining groups when the distance between groups becomes significant. Such groups become verticals with internal structure comprised of smaller groups (clusters). Smaller groups inside a vertical resemble intents. Intents can be interpreted as a hierarchy, from specific to more general ones.

Given intents and lists of APIs included in each intent, a separate algorithm builds intent ontologies. Intent Ontology is a complete set of parameters together with their description, inter-relation and constraints that describe the context of some intent. Example: for the Transportation intent, "from", "to", "departure time", "arrival time", "vehicle type" are all elements of the intent ontology.

For building intent ontology the algorithm analyzes all relevant API ontologies and chooses required parameters (that exist in each or most APIs in the group based on a threshold) and optional parameters (that differ from API to API or are present only in a small part of APIs in a group). Some parameters which are shared across different intents or verticals and are related to APIs in general (like authorization parameters, input-output formats, requests for debugging information or human-readable output, etc) are marked as "service" parameters.

Each intent is labeled with a meaningful name. An algorithm chooses more general terms for general (higher in the hierarchy) intents, and more specific terms for intents lower in the hierarchy. These can be action names (transportation.*), data types (i.e. ai.text.*), or something else.

The intent labeling algorithm 350 can choose the best term on its own, or give a list of ranked recommendations to a moderator to choose from. The algorithm chooses or generates such names from any method that is capable to build an aggregated representation of a cluster. Such a method could be a language ontology, topic model, neural network or other generative model, machine learning classifier, information retrieval methods, tag aggregation or something else.

This allows to create a catalog of APIs (216, 217) based not on a predefined category or tags, but using a hierarchy of intents. I.e. "transportation.taxi" or "ai.text.translate".

Synthesizing Integration Code to Make Call of a Particular API Using the Intent

Upon building the intent ontology the system creates mapping between the intent and API parameters, which is capable of matching parameters and apply transformations to the data passed to or from the API.

This mapping can be synthesized in a programming language or executable code to be provided with a specialized SDK (Software Development Kit) in an integrated or a downloadable manner.

Figure 5A:
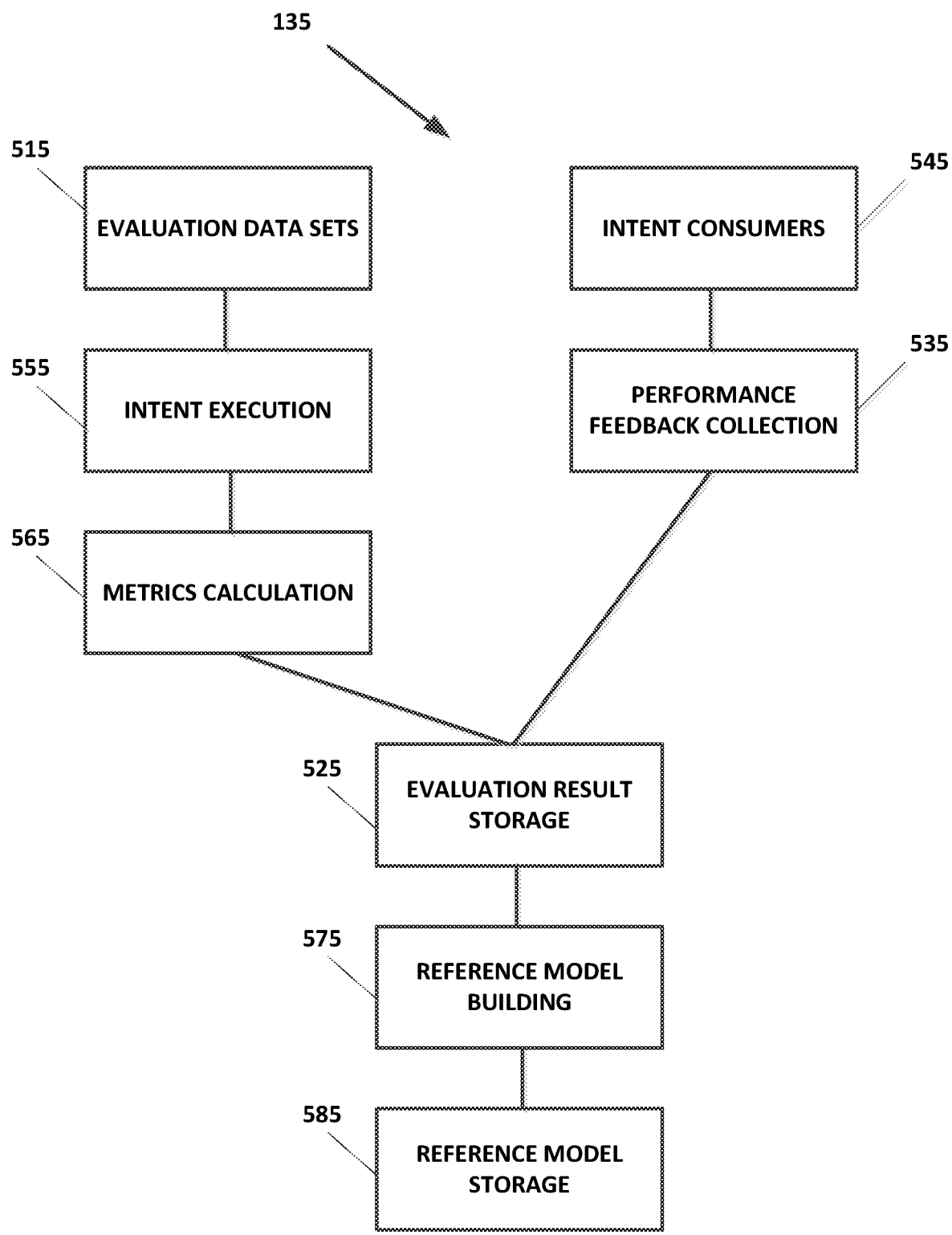
FIG. 5A is a schematic representation of the Evaluation subsystem.

FIG. 5A is a schematic representation of the Evaluation subsystem 135 according to the present invention.

The Evaluation Datasets 515 are developed for intent fulfillment evaluation. Example: dataset of reference translations (source and target sentence pairs) for machine translation, dataset of sentiments in the text (texts and corresponding sentiments), dataset of speech recognitions (voice samples with corresponding texts).

The Evaluation Result Storage 525, is configured to store evaluation dataset processing results (example: translations obtained from a machine translation service), performance feedback (example: a human effort required to correct results received from a machine translation API), intermediate and final metrics (example: BLEU or LEPOR score for machine translation).

Performance Feedback Collection 535 module collects performance feedback from intent consumers 545 and stores them into Evaluation Result Storage 525. The feedback comes in different forms including but not limited to: providing by clients using a special API, sending using email or uploading into a special web-service.

Intent Execution module 555 runs evaluation datasets 515 through selected intents and providers using the API integration subsystem 150 and stores all relevant results and technical metrics to the Evaluation Result Storage 525.

Metrics Calculation module 565 performs calculation of quality metrics and their statistical significance and stores them into Evaluation Result Storage 525.

Reference Model Building module 575 builds reference models for APIs.

Reference Model Storage 585 stores Reference models.

Reference model for API takes input data (example: text for translation); takes explicit parameters from an ontology (example: source and target languages for translation); takes implicit parameters mined from the inputs (example: linguistic features of the text, domain); obtains a list of directly specified ranking parameters (example: order of preference for a set of APIs); estimates list of ranking parameters for using in bidding strategies (examples: price for the request, quality, latency), runs bidding strategies (examples: best quality; best price); and calculates ranking scores based on model decisions.

Reference models can be of different types: Category-based models (example: for machine translation using source/target languages and domain to select an API with the best possible quality according to the evaluation results for the given set of parameters), AI-based models (example: a deep learning model for predicting provider quality given input data, explicit and implicit parameters, solving regression task of predicting a LEPOR metric for the request given, built using unsupervised pre-training on a large corpus of texts and supervised learning on evaluation results or reinforcement learning using externally provided quality signals).

Figure 6:
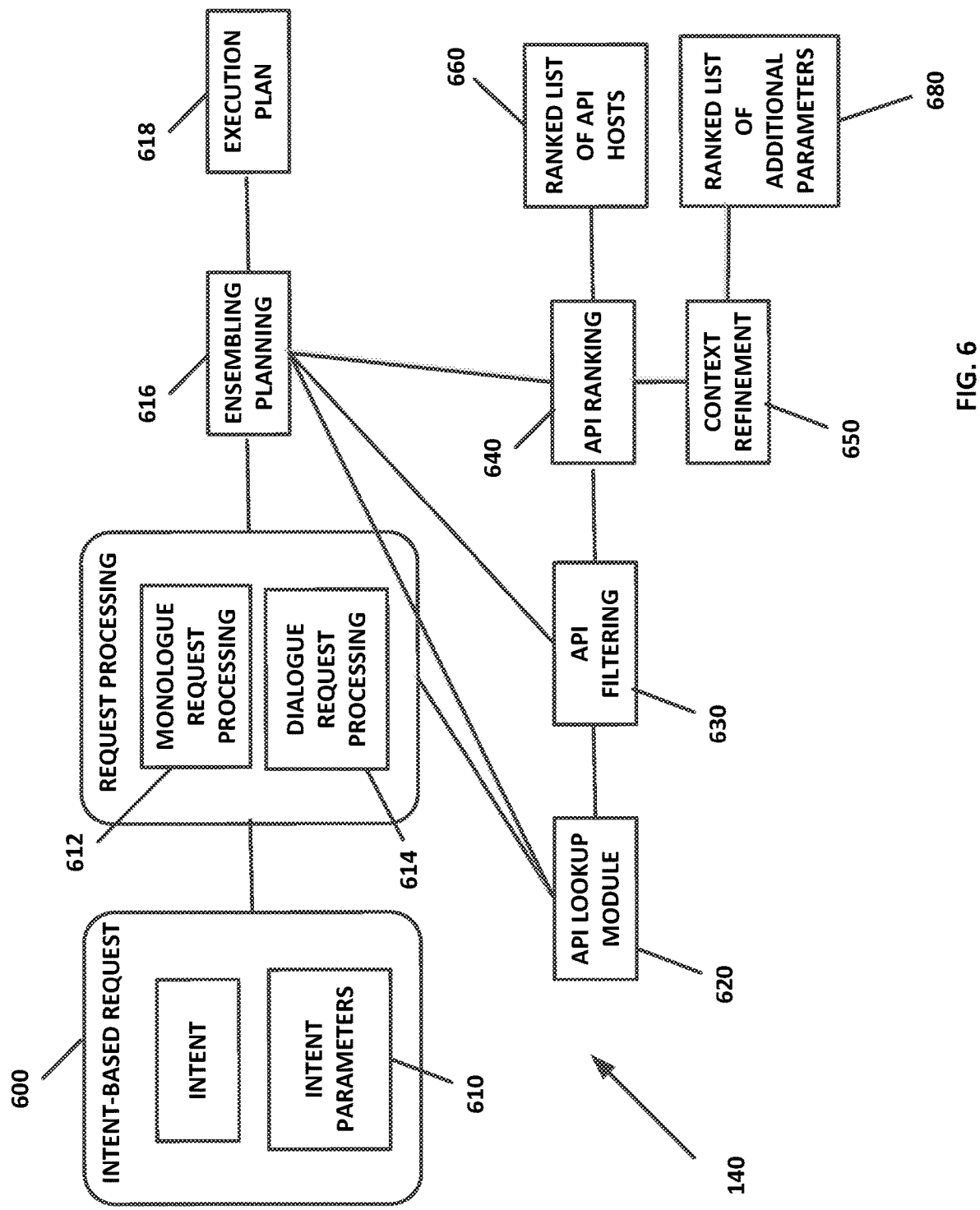
FIG. 6 is a schematic representation of the API Dispatcher subsystem according to the present invention.

FIG. 6 is a schematic representation of the API Dispatcher subsystem 140 according to the present invention.

The API Dispatcher subsystem receives an Intent-Based Request 600 and identifies the API Schema and API Endpoint that match the request based on the user bidding strategy and the API evaluation results.

The API Dispatcher subsystem 140 operates in one of two modes: Monologue mode and Dialogue mode.

Monologue Mode 612

In the monologue mode, the Request processing subsystem interprets the Intent Parameters 610 within the Intent Ontology and API Lookup module 620 finds the API Schemas with the corresponding endpoints that can fulfill the request given the specified Intent Parameters or parameters derived from the request data (example parameters: text length, detected language, image category). Then API filtering module 630 filters API Schemas with endpoints found to satisfy additional explicit or implicit constraints (example: quality is not less than X, cost is not more than Y, response time is not larger than Z). If there is more than one API Schema with endpoints that can accept such request, they are ranked using the API Ranking module 640, resulting in the ranked list of API Hosts (endpoints) 660. The ranked list may be communicated back to the user and/or passed on to the API Integration subsystem 150.

Ranking may comprise: data enrichment (example: automatic detection of the language of a text in the incoming request); obtaining results from reference models (example: predicting translation quality of a set of providers; selecting top-3 providers based on the source/target language from the request parameters and a subset of evaluation results for the same source/target pair); calculating order of preferences using one of the execution strategies (example: best price, best quality with price thresholds, best latency, simple top-1).

For example, a request may have an intent "translate text" with an array of texts to translate, target language and a parameter "domain: 'biomedical'" specified, and a bidding strategy set to "best_quality" with the constraint of "being cheaper than $15/million symbols". Then one of the possible algorithms for the API Dispatcher may result in the following sequence of actions: (1) automatic detection of the language is performed (data enrichment); (2) the API Lookup subsystem retrieves a list of APIs, satisfying the following constraints: (i) supports translation for specific source/target language pair, (ii) the API price is cheaper than $15/million symbols, (iii) batch translation is supported; there may be several APIs from different Machine Translation providers that match the request; (3) to rank the matching APIs according to the bidding strategy "best_quality", reference models are used to predict expected quality score of the translation for each API, along with the corresponding confidence intervals; (4) the APIs are grouped according to the confidence bounds of the quality scores to treat the models with intersecting confidence bounds as the same quality; (6) the APIs inside the groups are rearranged from low to high price; (7) the list of groups is reordered according to the estimated quality, resulting in a ranked list of endpoints that suit the initial request.

Identifying the API schema and API Endpoint that match the request may use the ensembling mode.

Ensembling mode may comprise: sending requests to multiple APIs to synthesize the answer, either if multiple APIs need to be combined to produce a desired output (example, for sentiment analysis one API can provide information on the sentiment found and its score, another API can provide subjectivity/objectivity classification and its score, yet another API can provide an irony detection option) or when outputs of multiple APIs need to be combined to increase accuracy of the result using voting or similar technique (example, for image classification the system can perform calls to a set of similar APIs with the same data then combine classification results into a single answer aggregating predictions into a single more accurate answer).

Ensembling Planning module 616 is responsible for planning of the process.

Execution Plan 618 is a result produced by the Ensembling Planning module 616. It is a recipe of in what order to call the particular APIs, and how exactly to combine the results of these separate calls into the aggregated result.

Dialogue Mode 614

In the Dialogue mode, the Context Refinement algorithm 650 is used to identify missing Intent Parameters from the Intent Ontology, which may affect the API Schema or API Host ranking. Further, such parameters 680 may be passed back to the Client that initiated the request.

For example, for intent "delivery.food" with parameter "location: (latitude, longitude)" there may be a number of API Hosts identified and ranked based on the delivery time. However, adding type of the food (e.g. type: "pizza") will result in a very different ranking order of the API Hosts, based on the ability of the service providers to deliver pizza. In such case, the Client will receive an unspecified parameter to further refine the request.

The API Integration subsystem 150 receives the Intent Request and the API Schema and synthesizes an Integration Code (or takes already synthesized integration code from the storage) that:

1. Translates Intent Parameters from the Intent Ontology to the API Schema Ontology
2. Performs the request to the API Host using the Transport Protocol Gateway to translate the request to the proper technical stack.
3. Receives the answer from the API.
4. Translates the answer or error signals back to the Intent Ontology.

It may operate in two modes: centralized, when all requests and answers are routed through the Intento IPaaS (Integration Platform as a Service) platform and decentralized, when the requests are sent directly from the client to the API endpoint using the Intento SDK.

Performing the request to the API Host may comprise additional capabilities: performing retry in the case of provider temporary unavailability; performing fallback to the next provider in the case of provider temporary unavailability; ensembling results from several different providers; calling additional middleware to enrich the results (example: performing language autodetection for the text-based request) or execute special logic (example: for a short text call a dictionary API, for a long text call a translation API); performing API feature harmonization.

API feature harmonization is way to provide the same level of developer experience (DX) when one API may possess capabilities missing for another API; in some cases they may be implemented using other APIs or components of our system; this is implemented as an additional layer of our system (examples: allow batch processing for providers that do not support it; implementing glossary or translation memory for machine translation providers without such support; auto-detecting input text language for providers without such an option).

Figure 7:
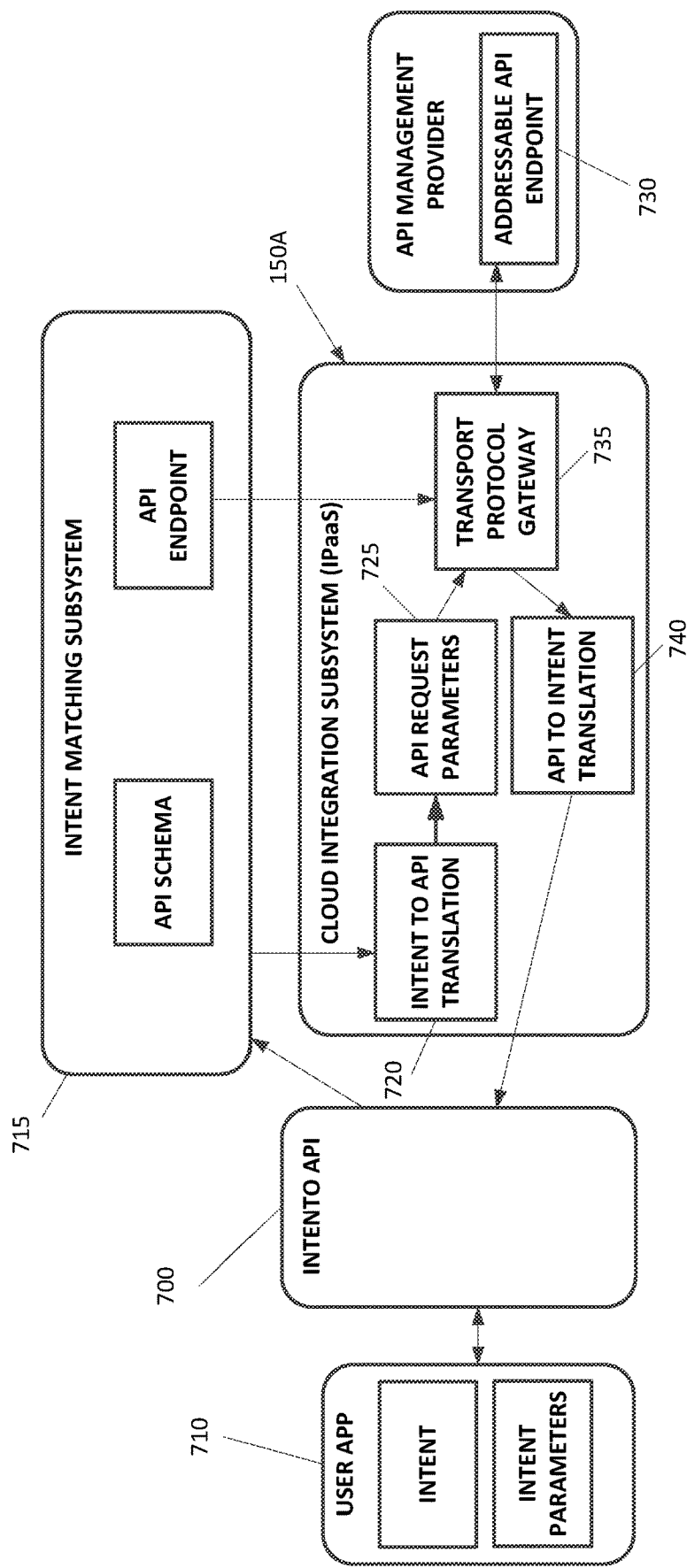
FIG. 7 is a schematic representation of the API Integration subsystem in the centralized mode, according to the present invention.

FIG. 7 is a schematic representation of the API Integration subsystem 150A in the centralized mode, according to the present invention.

Figure 9:
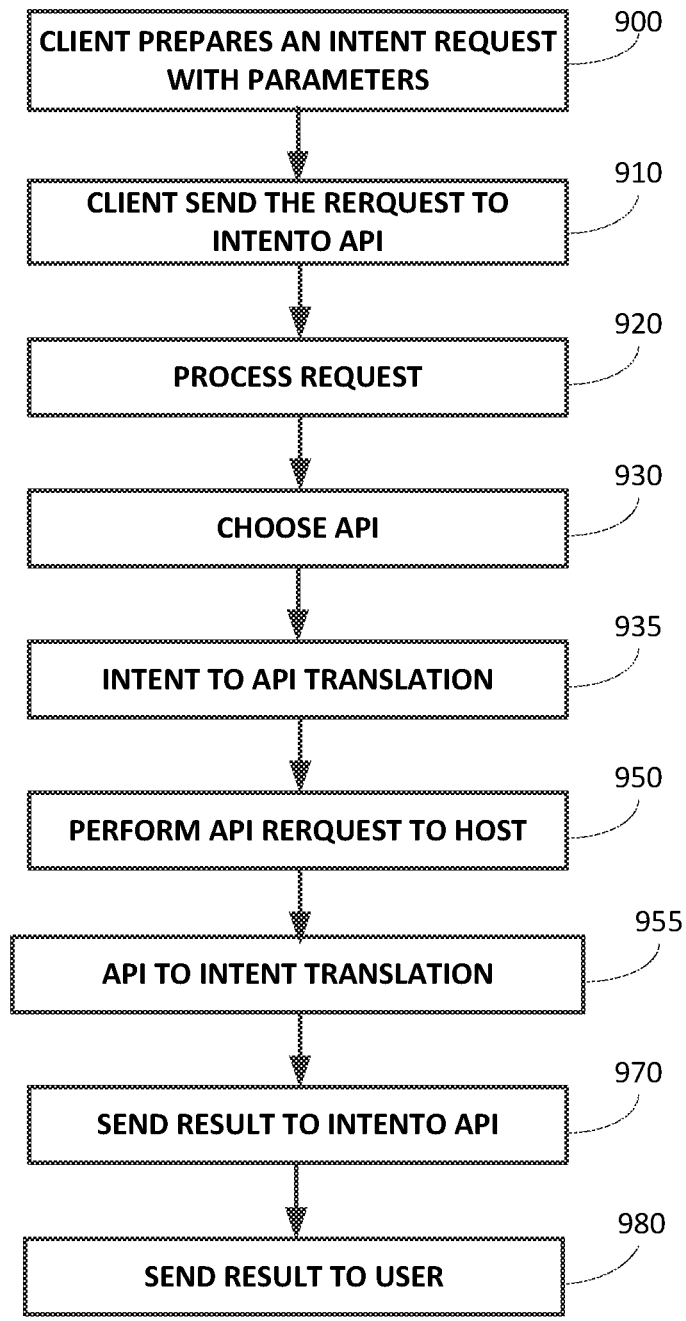
FIG. 9 is a flowchart showing the steps taken by the centralized mode.

FIG. 9 is a flowchart showing the steps taken by the centralized mode.

In the centralized mode all integrations are hosted in the cloud, the client (user application 710) sends a request to the Intento API 700 (steps 900, 910) and receives an answer from the Intento API 700.

The Intento API processes the request (step 920) using Intent Matching Subsystem 715 and identifies the API Schema with API Endpoint that matches the request and can fulfill the request given the specified Intent Parameters. If there are a number of APIs that can accept such request, then the system ranks all relevant API Schemas using the specified strategy, as described in conjunction with FIG. 6, which could be passed as a parameter. Then the Intent Matching Subsystem 715 chooses the best one according to the chosen or default strategy (step 930).

For the chosen API Schema with addressable API Endpoints the Cloud Integration Subsystem 150A performs Intent to API Translation 720 (step 935) and obtains API request parameters. Then it performs the API request to the Addressable API Endpoint 730 (step 950) using the Transport Protocol Gateway 735. The result is delivered back using the same Transport Protocol Gateway 735 and translated to Intent Context (step 960) by API to Intent Translation 740. Then it is returned by Intento API 700 to the User App 710 (steps 970, 980).

Figure 8:
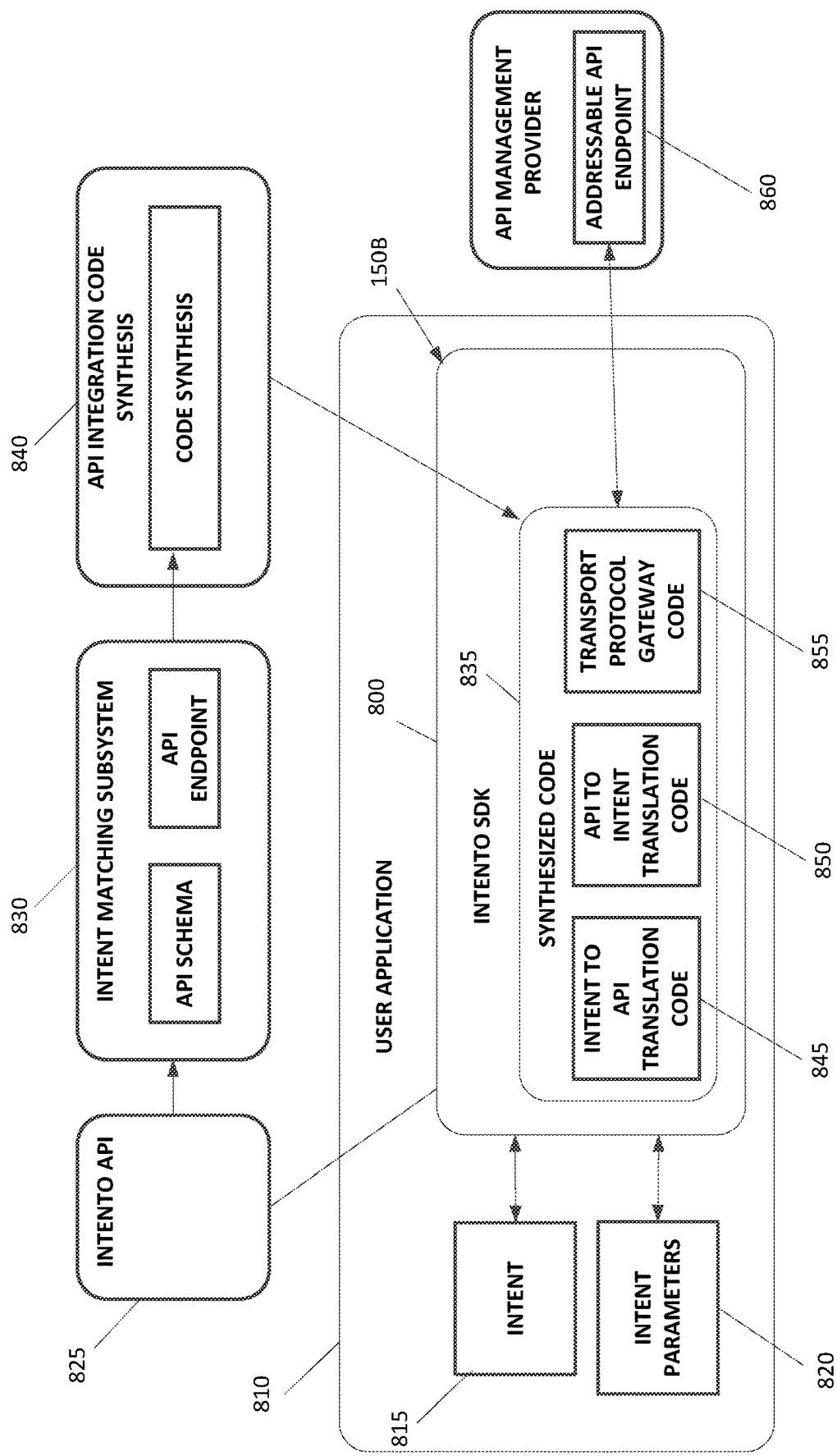
FIG. 8 is a schematic representation of the API Integration subsystem in the decentralized mode, according to the present invention.

FIG. 8 is a schematic representation of the API Integration subsystem 150B in the decentralized mode, according to the present invention.

Figure 10:
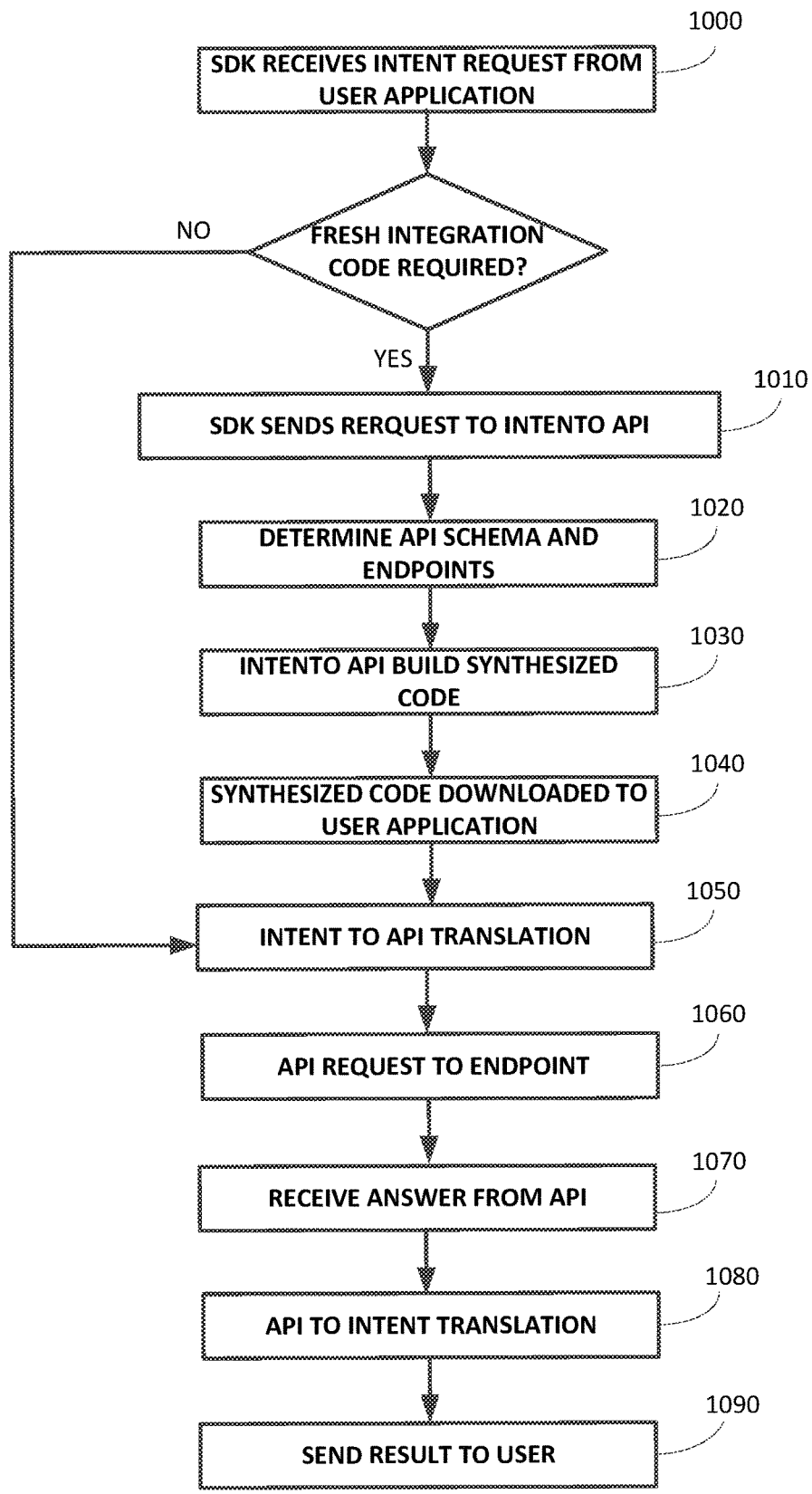
FIG. 10 is a flowchart showing the steps taken by the decentralized mode.

FIG. 10 is a flowchart showing the steps taken by the decentralized mode.

In the decentralized mode, a developer plugs Intento SDK 800 into User Application 810. Then the User Application makes Intent-based requests to the SDK (815, 820) (step 1000). The Intento SDK determines whether fresh integration code is required to be downloaded using the Intento API (step 1010) and if fresh integration code is downloaded, the Intento SDK jumps to performing the direct API call using the integration code (step 1055). If the Intento SDK has no relevant code available to perform the request, it uses Intento API 825 which calls Intent Matching Subsystem 830 to determine proper API Schema with API Endpoint (step 1030). Then it builds a Synthesized Code 835 (step 1040) using API Integration Code Synthesis 840. The Synthesized Code 835 is downloaded into the User Application 810 (step 1050) and is used for fulfilling the intent request on its own, without using the cloud (steps 1055,1060,1070). The Synthesized Code 835 contains Intent to API Translation Code 845, API to Intent Translation Code 850, and Transport Protocol Gateway Code 855. The Intent to API Translation Code 845 translates the intent parameters 820 into parameters of a particular API. The API to Intent Translation Code 850 translates API call results back to the Intent return parameters. The Transport Protocol Gateway Code 855 is responsible for the communication with the chosen API. It makes the direct request to the API Endpoint 860, receives the answer and returns the result to the user application via the intent API (steps 1070, 1080).

The Synthesized Integration Code 835 contains a set of constraints that define if the subsequent requests can use the same integration code or a new one should be synthesized and downloaded to the SDK. The client may override this behavior by requesting to flush the cached Integration Code.

The invention claimed is:

1. A service platform for routing intent-based API (Application Programming Interface) requests to the most relevant APIs, comprising:

a data ingestion subsystem, configured to retrieve API schema definitions and context information from external sources and store them in an API schema library;
an ontology mining subsystem, comprising:
an API Ontology Extraction module, configured to build an ontology for a single API;
an API Ontology Hierarchical Clustering module, configured to hierarchically cluster API Ontologies to discover Latent Intents Hierarchies; and
an Intent Ontology Mining module, configured to build ontologies for said discovered intents hierarchies;
an API dispatcher subsystem, configured to receive an intent-based request comprising intent parameters and identify the API schema and API Endpoint that match the request; and
an API integration subsystem, configured to:
receive said intent-based request and said matched API schema and API Endpoint;
use said intent ontology to translate said intent parameters to the matched API schema ontology;
perform the request to the API host;
receive an answer from the API host;
translate the answer back to the intent ontology; and
synthesize an integration code.

2. The service platform of claim 1, wherein said data ingestion subsystem comprises:
an API extraction module, configured to identify API schemas in text documents;
an API Schema Lookup module, configured to checks whether an identified API schema has a corresponding API Schema in the API Schema Library;
an API Schema Updater module, configured to update an API in the API schema library with new data from the text document;
an API Host Discovery Module, configured to discover physical instances of the API Schema addressable via the Internet or Intranet;
an API Endpoints Library storing all known endpoints for discovered APIs;
an API Data Enrichment Module, configured to perform API schema enrichment using of external services;
a data Ingestion Monitoring module, configured to monitor the data ingestion pipeline and produce visualizations, alerts and system checks to detect whether all parts of the pipeline function correctly; and
a Web Server comprising a representational layer of the system.

3. The service platform of claim 2, wherein said API Host Discovery Module comprises:
an API Host Library, storing all known physical instances of the API Schemas;
an API Host Extractor module, configured to extract API host from said text documents; and
an API Host Probe module, configured to probe network hosts to check for the presence of any addressable API.

4. The service platform of claim 2, wherein said API Data Enrichment Module comprises:
an API Schema Context database storing all relevant information related to an API found on external services;
an API Enrichment module, configured to find mentions of the API in other text documents and stores them in the API Schema Context database; and
an API Presentation module, configured to process API Enrichment data from said API Schema Context database to achieve proper presentation of the API in an API Catalog.

5. The service platform of claim 2, wherein said Web Server comprises:
an API Catalog Web UI module comprising a web interface, configured to allow end-users to navigate through a catalog of the APIs; and
an API Catalog Backoffice UI module comprising a web interface, configured to allow system administrators interaction with parts of the process.

6. The service platform of claim 1, wherein said ontology mining subsystem further comprises:
an Ontology Labeling module, configured to label the Intent ontologies with meaningful names.

7. The service platform of claim 1, wherein said Intent Ontology Mining module comprises a General Ontology Building module, configured to build a general ontology for all APIs in some intent, based on clustering of previously extracted API Ontologies.

8. The service platform of claim 1, wherein said API Ontology Extraction module comprises:
a general Language Ontology that describes the general knowledge of the world;
an API Ontology Library storing all extracted API Ontologies; and
an API Ontology Extractor module, configured to construct and update the API Ontology for a particular API, based on the API Schema, General Language Ontology and API Enrichment Data.

9. The service platform of claim 1, further comprising an evaluation subsystem, configured to evaluate a set of APIs based on chosen datasets and metrics or by externally provided quality signals, wherein said evaluation subsystem comprises:
Evaluation Datasets, developed for intent fulfillment evaluation;
Evaluation Result Storage, configured to store evaluation dataset processing results, performance feedback, intermediate and final metrics;
Performance Feedback Collection module, configured to collect performance feedback from intent consumers and store them in the Evaluation Result Storage;
Intent Execution module, configured to run evaluation datasets through selected intents and providers using the API integration subsystem and store all relevant results and technical metrics in the Evaluation Result Storage;
Metrics Calculation module, configured to calculate quality metrics and their statistical significance and store them in the Evaluation Result Storage;
Reference Model Building module, configured to build reference models for APIs; and
Reference Model Storage, configured to store Reference models.

10. A method of routing intent-based API (Application Programming Interface) requests to the most relevant APIs, comprising:
retrieving API schema definitions and context information from external sources and storing them in an API schema library;
building an ontology for a single API;
hierarchically clustering API ontologies to discover latent intent hierarchies and sub-hierarchies;
building ontologies for said discovered hierarchies of intents;
receiving an intent-based request and identifying the API schema and API Endpoint that match the request;
using said intent ontology to translate said intent parameters to the matched API schema ontology;

performing the request to the API host;
receiving answer from the API host;
translating the answer back to the intent ontology; and
synthesizing an integration code.

11. The method of claim 10, wherein said retrieving API schema definitions and context information comprises:
identifying API schemas in text documents;
checking whether an identified API schema has a corresponding API Schema in the API Schema Library;
updating an API in the API schema library with new data from the text document;
discovering physical instances of the API Schema addressable via the Internet or Intranet;
storing all known endpoints for discovered APIs;
performing API schema enrichment using external services; and
monitoring the data ingestion pipeline and producing visualizations, alerts and system checks to detect whether all parts of the pipeline function correctly.

12. The method of claim 10, further comprising building a general ontology for all APIs in some intent, based on clustering of previously extracted API Ontologies.

13. The method of claim 10, wherein said identifying the API schema and API Endpoint that match the request comprises one of a monologue mode and a dialogue mode, wherein said monologue mode comprises:
interpreting the Intent Parameters within the Intent Ontology and finding one or more API Schema with corresponding endpoints that can fulfill the request given said Intent Parameters; and
ranking said found one or more API Schema with the hosts associated with said retrieved endpoints; and
wherein said dialogue mode comprises identifying missing Intent Parameters.

14. The method of claim 13, wherein said ranking comprises using at least one of evaluation data sets processing results and performance feedback collected from users.

15. The method of claim 13, wherein said ranking comprises using a user's bidding strategy.

16. The method of claim 13, further comprising filtering said found one or more API Schema to satisfy additional explicit or implicit constraints.

17. The method of claim 10, wherein said identifying the API schema and API Endpoint that match the request comprises at least one of: ensembling results of multiple APIs, performing fallback to a next provider in the case of provider unavailability, and harmonizing features of said identified API schema by adding features.

18. The method of claim 10, wherein said synthesizing an integration code is performed in one of a centralized mode and a decentralized mode, wherein in said centralized mode said synthesizing an integration code runs on a cloud integration subsystem communicating bi-directionally with addressable API endpoints and with a system running on a client device, and
wherein said decentralized mode comprises:
invoking an intent method in a system SDK running on a client computer;
building synthesized Integration Code by said system SDK;
translating the intent parameters into parameters of a particular API;
making a direct request to said particular API Endpoint;
receiving an answer; and
translating it back to intent return parameters.

19. The method of claim 10, further comprising evaluating a set of APIs based on chosen datasets and metrics or by externally provided quality signals.

20. One or more computer storage media having stored thereon multiple instructions that, when executed by one or more processors of a computing device, cause the one or more processors to:
retrieve API schema definitions and context information from external sources and store them in an API schema library;
build an ontology for a single API;
hierarchically cluster API ontologies to discover latent intent hierarchies and sub-hierarchies;
build ontologies for said discovered hierarchies of intents;
receive an intent-based request and identifying the API schema and API Endpoint that match the request;
use said intent ontology to translate said intent parameters to the matched API schema ontology;
perform the request to the API host;
receive an answer from the API host;
translate the answer back to the intent ontology; and
synthesize an integration code.

* * * * *